United States Patent [19]

Engeler et al.

[11] 4,379,405
[45] Apr. 12, 1983

[54] FORCE TRANSDUCER, PARTICULARLY FOR BALLISTIC PRESSURE MEASURING

[75] Inventors: Paul Engeler, Frauenfeld; Hans C. Sonderegger, Neftenbach; Peter Wolfer, Andelfingen, all of Switzerland

[73] Assignee: Kistler Instrumente AG, Winterthur, Switzerland

[21] Appl. No.: 270,842

[22] Filed: Jun. 5, 1981

[30] Foreign Application Priority Data

Jun. 10, 1980 [DE] Fed. Rep. of Germany ....... 3021778

[51] Int. Cl.³ .............................................. G01L 5/14
[52] U.S. Cl. ..................................... 73/167; 73/744; 89/14 R
[58] Field of Search .................... 73/167, 35, 12, 744; 89/14 R; 346/38

[56] References Cited

U.S. PATENT DOCUMENTS

| 2,347,188 | 4/1944 | Garand | 73/744 |
| 3,886,792 | 6/1975 | Change et al. | 73/167 |
| 3,960,018 | 6/1976 | Change et al. | 73/167 |

FOREIGN PATENT DOCUMENTS

| 2245998 | 4/1973 | Fed. Rep. of Germany . |
| 2516120 | 11/1975 | Fed. Rep. of Germany . |
| 573592 | 3/1976 | Switzerland . |

OTHER PUBLICATIONS

"Quartz Pickups Measure Pressure", Kernin, *Radio-Electronics*, Oct. 1962, pp. 36–38.
"Experiments in Interior Ballistics", Tschappat, *Mechanical Engineering*, Aug. 1926, vol. 48, No. 8, pp. 819–825.

*Primary Examiner*—Howard A. Birmiel
*Attorney, Agent, or Firm*—Oblon, Fisher, Spivak, McClelland & Maier

[57] ABSTRACT

A force transducer, particularly for the ballistic measuring of the combustion pressure in the cartridge case of a firearm, is disclosed which includes a force transmission element which rests with one of its front areas on the cartridge case. The force transmission element is surrounded on its exterior by an outer sleeve which also rests with its front area on the cartridge case. The front areas of the force transmission element and of the outer sleeve are exactly adapted to the curvature of the cartridge case by reaming after the transducer has been mounted in the firearm. With the combustion of the powder, the cartridge case expands and transmits its force to a sensor element via the force transmission element, with the sensor element being preferably in the form of at least one piezoelectric transversal quartz element which is held under pretension between the force transmission element and a basic receiver component. The spring rigidity of the force transmission element and the spring rigidity of the outer sleeve are matched in such a way that both parts yield essentially to the same extent to the pressures acting upon them in the axial direction of the transducer. The result is that the contact conditions of the cartridge case with the front area of the force transmission piston do not change appreciably after the expansion in comparison with the initial conditions so that a calibration curve of the force transducer which is independent of the installation can be supplied by the manufacturer.

11 Claims, 11 Drawing Figures

FORCE TRANSDUCER, PARTICULARLY FOR BALLISTIC PRESSURE MEASURING

BACKGROUND OF THE INVENTION

1. Field of the Invention

The present invention relates to a novel force transducer, particularly for ballistic pressure measuring, which includes a force transmission element subjected to the pressure to be measured at one of its frontal areas, a sensor element held under pretension between the force transmission element and a basic receiver component, and an outside sleeve surrounding the outside of the force transmission element and subjected to the pressure to be measured at its frontal area. Additionally, a method for the production of the novel force transducer is disclosed.

2. Description of the Prior Art

Different methods and measuring arrangements are known for determining the level and the development in time of the pressures occurring in a cartridge case. A known method provides for the use of "copper crushers" or copper crusher gauges. For this purpose, a hole is drilled into the cartridge case and the combustion gases are led into a cylinder surrounding a piston. The piston presses on a cylindrical copper piece which, depending on the level of the pressures of the combustion gas, is more or less compressed. The expansion of the diameter or the reduction in the length of the copper piece gives an indication of the level of the pressure in the cartridge case. This method serves the purpose of comparison testing; it gives not an indication of the respective prevailing peak pressures since the compression not only depends on the peak pressure but also on the induction period of the pressure.

A better indication of the development of the pressure is obtained when the pressure in the cartridge case into which a hole has been drilled is transmitted to a piezoelectric high pressure transducer. The entire development in time of the pressure can then be recorded by an oscillograph so that the peak pressure as well as the pressure rise and pressure drop can be precisely quantitatively determined.

Both of the above methods have a systematic deficiency in that a hole must be drilled into the cartridge case for this purpose. Apart from the gas losses in the cartridge case or cartridge chamber caused by the hole drilled into it, the necessary connecting duct to the pressure transducer involves additional volume and the pressure build-up is lessened because of the larger volume behind the cartridge case. Thus, the measured peak pressures do not correspond to the actual pressures in the cartridge case.

Another known method provides for the measuring of the pressure directly in the drilled hole of the cartridge chamber into which the cartridge case is introduced. Drilling a hole into the cartridge case can thus be avoided. Apart from the fact that a measuring error also occurs with this method because of the additional volume, this method has the disadvantage that no measuring signal is received prior to the time when the projectile leaves the drilled hole of the cartridge chamber. Therefore, the pressure build-up in the interior of the cartridge case is not determinable during the first phase of the combustion and the sudden release of the measuring duct to the pressure transducer by the projectile indicates too steep a pressure rise.

Another piezoelectric pressure transducer for ballistic pressure measuring is shown in U.S. Pat. Nos. 3,886,792 and 3,960,018. This device rests on the shaft of the cartridge case by means of a diaphragm so that the forces resulting from the elastic and plastic expansion of the cartridge case are transmitted to the transducer. The transducer is installed in a hole drilled in the cartridge chamber for this purpose and the diaphragm in contact with the outer surface of the cartridge case is designed in such a manner that it forms a continuation of the part of the hole drilled in the cartridge chamber which is cut away by it. The pressure in the cartridge case expands the case somewhat so that the force is transmitted to the piezoelectric measuring quartz elements arranged in the pressure transducer through the cartridge case and the diaphragm on the pressure transducer. The electrical charge of these quartz elements is led to an electrometer or charge amplifier. This known method has the advantage that the measuring system does not interfere practically with the combustion process and the flow conditions and, additionally, it is possible to also provide for serial measurements since no special measuring preparations are necessary for the individual shots. However, this known arrangement has the disadvantage that it is very difficult to exactly adapt the pressure recording front portion of the pressure transducer to the hole drilled in the cartridge chamber or at the outside circumference of the cartridge case.

Considered from the point of view of measuring technique, the connection between the gas pressure in the cartridge case and the released piezoelectric charge should be as linear as possible. The piezoelectric effect is actually very linear per se but the pressure is not effected in a proportional force in the cartridge case due to the complicated transmission to the measuring quartz elements. Since a cartridge case must always have a certain play in the cartridge chamber so that it can be inserted or thrown out without difficulty, there exists already a certain discontinuity from this point of view when the cartridge case is expanded by the combustion pressure and rests closely against the inside of the borehole in the cartridge chamber. Up to that point in time, the gas pressure has an effect only in the inside of the cartridge case but not on the pressure transducer. Therefore, the first phase is not measured prior to the point when the cartridge case rests against the front portion of the pressure transducer. The pressure indication prior to this point in time is zero. In order to obtain the effective pressure, the initial cartridge expansion pressure must be added to the measured pressure which, however, does not present any problem from the point of view of the measuring technique.

As has been shown by experience, the cartridge case is always plastically deformed when the slot is fired and remains expanded after the shot. Therefore, when the front portion of the pressure transducer which rests on the cartridge case is part of the borehole in the cartridge chamber and projects into it, the curve $Q=f(P)$ recorded by the pressure transducer initially rises steeply because, initially, the cartridge case presses only on the pressure transducer and drops thereafter as soon as the cartridge case starts resting against the borehole in the cartridge chamber with higher pressures. However, when the front portion of the pressure transducer is somewhat recessed in comparison with the cartridge chamber borehole, a gap remains between the cartridge case and the front portion of the pressure transducer. The cartridge case bulges only under higher pressures in the area of the pressure transducer to such an extent that it contacts it. In this case, there exists a more or less large range in which no measuring signal is transmitted by the transducer depending on the size of the recessing of the front portion of the pressure transducer. The exact adaptation of the shape of the front portion of the pressure transducer to the respective configuration of the cartridge case is not only of importance for the size of the range over which the pressure transducer responds but also for the reproducibility of the measurement since even slight inhomogenities can lead to discontinuities in the force distribution on the measuring quartz elements.

Due to these circumstances, it is proposed in the aforementioned U.S. patents that the front portion of the pressure transducer formed by the diaphragm be adapted to the configuration of the cartridge chamber borehole by means of washers. Apart from the fact that such adjustment measures are bothersome and undersirable for the customer, the required contact exactness of a few micrometers is not given so that certain edge pressures and such still remain. This has the result that no pre-established calibration curve can be made available to the user of the pressure transducer which can be used at the point of application for the evaluation of the measurements without having to take any additional measures. On the contrary, the known piezoelectric pressure transducers for ballistic measurements always require that the user carry out a static calibration with a gas or a liquid for the respective firearm, i.e. to establish an individual calibration curve. Besides the mentioned circumstances, this is also necessary because the rigidity of a pressure transducer is always lower than that of the cartridge chamber so that the pressure transducer and the cartridge chamber suffer different deformations with the expansion of the cartridge case, i.e. the diaphragm of the pressure transducer is recessed vis-a-vis the outer circumference of the cartridge chamber borehole. The developed depression has the result that the cartridge case no longer rests completely against the front face of the diaphragm as assumed in the calibration but the contact surface is more or less reduced depending on the size of the depression. The reduced force on the measuring quartz elements resulting from the change in the contact conditions is expressed as a deviation from the linear path of the calibration curve which differs from case to case. As a result, a calibration curve adapted to a particular application must always be established in the case of the known pressure transducers which, however, can sometimes involve considerable errors due to the kind of static application of the calibration pressure.

Furthermore, the measuring quartz elements are arranged very closely to the pressure-subjected diaphragm in the case of the known piezoelectric pressure transducers which, besides supplying a poor force distribution on the measuring quartz elements, has the disadvantage that they are exposed to a high thermal load.

SUMMARY OF THE INVENTION

Accordingly, one object of the present invention is to provide a novel pressure transducer for ballistic pressure measurement as well as a method for its production. The transducer can be supplied by the manufacturer with a calibration curve covering all respective cases of application.

According to the present invention, this task is accomplished by the fact that the spring rigidity of the outer sleeve is adjusted to the spring rigidity of the force transmission element exposed to the pressure to be measured on the front end independently of the outer sleeve in such a manner that the outer sleeve yields to approximately the same extent as the force transmission element to the effective pressure in the axial direction of the transducer.

The method according to the present invention for the production of the novel pressure transducer for ballistic pressure measurement is characterized by the fact that, in a first step, the force response sensitivity $E_1$ of the force transmission element is determined by itself, then an outer sleeve is arranged outside around the force transmission element in such a manner and is fastened to the basic portion of the transducer in such a way that its front end exposed to the pressure is in alignment with the front end of the force transmission element. In a second step, the force response sensitivity $E_2$ of this arrangement is determined and, in a third step, the wall thickness of the outer sleeve is reduced until the relation $$E_2 = \frac{1}{1 + \frac{F_2}{F_1}} \cdot E_1 \cdot f$$

is satisfied whereby $F_1$ represents the area of the front end of the force transmission element exposed to the pressure, $F_2$ represents the area of the front end of the outer sleeve exposed to the pressure, and $f$ represents a correction factor. Thus, a piezoelectric force transducer for ballistic measuring is created by the present invention which rests, as do the above described prior art arrangements, with its front portion on the outer circumference of the cartridge case. However, in a deviation from the prior art arrangements, the support is not only effected at the force transmission element but also at the outer sleeve surrounding the force transmission element whereby the outer sleeve as well as the force transmission element are crushed with a pressure acting on their front ends. Since the spring constants or spring rigidities of both parts are exactly adjusted to each other, they are essentially subjected to the same crushing effect with the result that little or no relative shifting occurs between the outer sleeve and the force transmission element. Therefore, the increased deformation of the cartridge sleeve in the area of the front portion of the transducer resulting from the crushing of the force transducer has essentially only an effect on the outer sleeve with regard to the change in the contact surfaces but not on the force transmission element so that the cartridge sleeve continues to fully rest against its front end even with the expansion. The calibration curve relative to the effect of the pressure on the entire front end of the force transmission element corresponds, therefore, with the signal emitted by the sensor element with a pressure exerted on the force transmission element by the expansion of the cartridge case. For this reason, calibration by the user of the force transducer according to the present invention is no longer necessary and the manufacturer is able to supply the force transducer with a given calibration curve. The measuring complexities are thus considerably reduced and, at the same time, the reproducibility of the measurement is increased since the user can himself effect the adaptation of the front portion of the power recorder to the respective configuration of the pressure-conveying component on which the transducer is arranged due to the design according to the present invention without thus making a significant influence on the given calibration curve. A piezoelectric force transducer with a sleeve surrounding the force transmission element is actually known from the German Disclosure Publication No. 2,516,120 but the purpose of this sleeve is for shielding and leading the power transmission element towards the outside.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
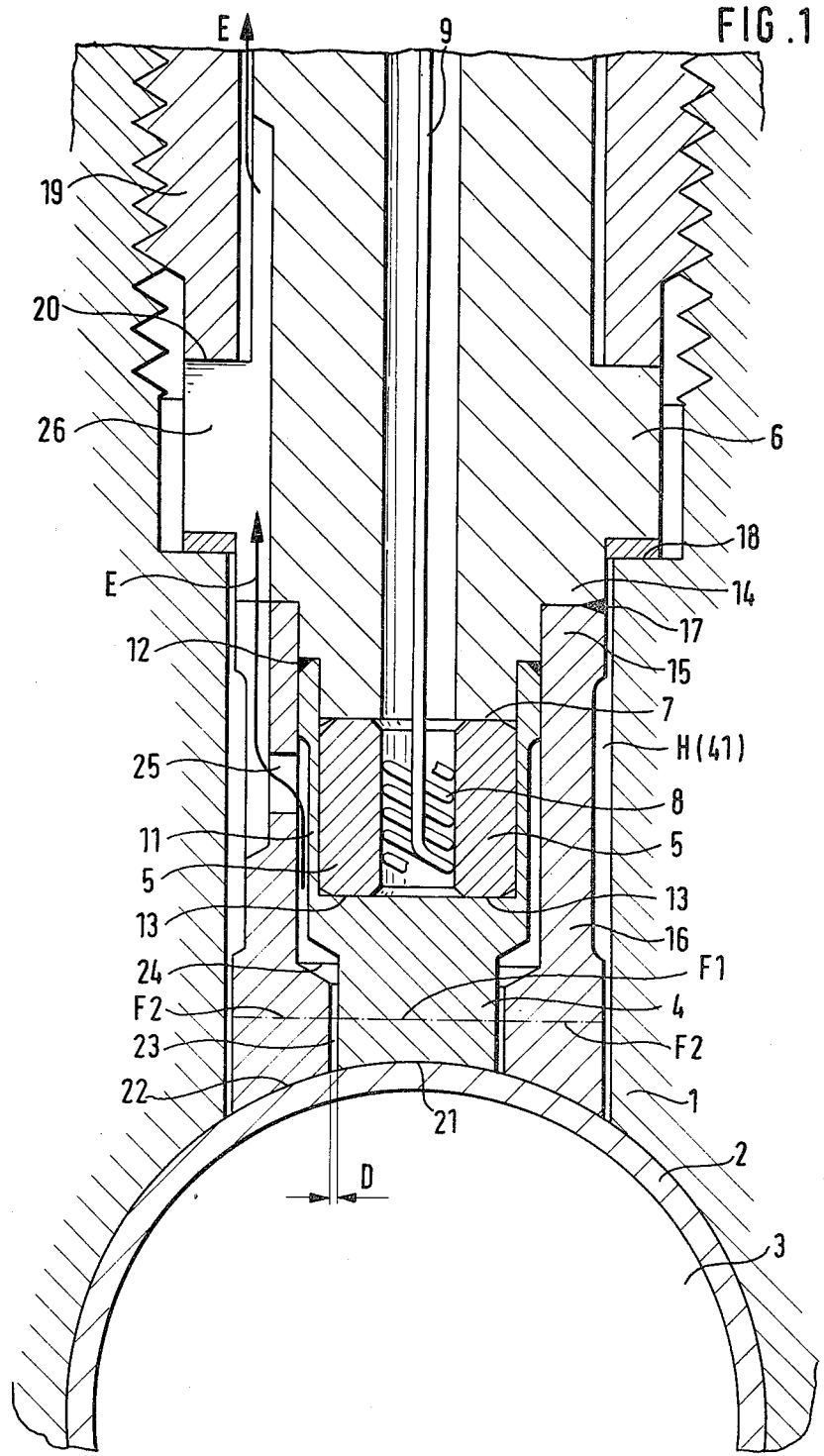
FIG. 1 is a cross-sectional view of a piezoelectric force transducer as installed in a hand firearm according to the present invention.

In the following description, the expressions "top" and "bottom" refer to the position of the ballistic force transducer according to the present invention as shown in the drawings.

Referring now to the drawings, wherein like reference numerals designate identical or corresponding parts throughout the several views, and more particularly to FIG. 1 thereof, a preferred embodiment of the ballistic force transducer according to the present invention is illustrated as installed in the cartridge chamber 1 of a typical hand firearm. A cartridge case 2 running slightly conically in the axial direction contains a supply of powder 3. The supply of powder 3 develops explosive gasses after ignition which leads to an expansion of the cartridge case 2. The ballistic force transducer is arranged in a borehole in the cartridge chamber 1, which is not given a reference number and which essentially extends vertically to the center axis of the cartridge case 2. The force transducer comprises, as shown, a force transmission piston 4 which rests in a flush manner on the outer circumferential surface of the cartridge case 2 with its one free lower front area 21. The piston transmits the force resulting from the expansion of the cartridge case 2 to a set of sensor elements in the form of piezoelectric measuring quartz elements 5. The force transmission piston 4 has, according to the present invention, a suitable axial length between its lower front area 21 and its opposite upper front area 13 so that the measuring quartz elements 5 are held a suitable distance from the front area 21. Additionally, the piston is reduced in diameter at its lower end so that the front area 21 which rests on the cartridge case 2 has a smaller area dimension than that of the area of surface 13 on which the measuring quartz elements 5 rest. In this way, a reduction in the force acting on the measuring quartz elements 5 is achieved.

The measuring quartz elements 5 are clamped with their opposite end faces, as shown, between the upper front area 13 of the force transmission piston 4 and the lower front area 7 of an upper basic receiver component 6 of the ballistic force transducer which is fixed in the cartridge chamber 2. For reasons to be explained below, it is preferable to use transverse quartz elements as measuring quartz elements with a special cut which is described in detail in German Patent 22 08 023 which is incorporated herein by reference. In the case of the present embodiment, two such measuring quartz elements 5 are provided which, for example, are isolated from each other by means of an air gap in the form of two semi-rings positioned concentrically to the center axis of the force transducer. They form together an inner space in which an element is arranged, for example, in the form of a spiral spring 8, which leads off the piezoelectric charge developed on the metallized inner surfaces of the measuring quartz transducers 5. The spiral spring 8 is connected with a connecting plug 10 shown in FIG. 2 through a line 9 led through a central borehole in the basic receiver component 6.

The spiral spring 8 serves the purpose of leading off the negative charges on the inner surfaces of the measuring quartz elements 5 while the positive charges developed on the outer surfaces of the measuring quartz elements 5 are led off to an earth connection through an adapter sleeve 11 forming part of the power transmission piston 4. The adapter sleeve 11 stretches, as shown, from the outer fringe range of the front area 13 of the force transmission piston 4 in the direction of the basic receiver component 6 and surrounds the outside of the measuring quartz elements 5. The adapter sleeve 11 leads off the charge and presses together the pair of measuring quartz transducers 5 between the front areas 7 and 13 of the basic receiver component 6 and force transmission piston 4. For this purpose, the adapter sleeve is welded under pretension at its upper end at 12 to a shelf surface of the basic receiver component 6. Due to the pretension of the measuring quartz elements 5, possibly existing gap elasticities are removed or reduced.

According to the present invention, the force transmission piston 4 is, as shown, concentrically surrounded on its outside by an outer sleeve 16 which is welded at 17 to the shelf surface 14 of the basic component 6 at its upper end 15. The lower end of the outer sleeve 16 forms an annular front area 22 which rests in a flush manner on the outer surface of the cartridge case 2 as does the front area 21 of the force transmission piston 4.

An annular gap 23 with a suitable width D of a few tenths of a millimeter remains, according to the present invention, between the inner circumferential surface of the lower thicker end area of the outer sleeve 16 directed towards the front area 22 and the respective section of the outer circumference of the force transmission piston 4. This annular gap 23 is coupled with an upper expanded annulus 24 between the outer sleeve 16 and the power transmission piston 4. The annulus 24 is further coupled with an annulus which is provided between the upper portion of the inner surface of the outer sleeve 16 and the outer circumferential surface of the adapter sleeve 11. A suitable point in the upper section of the outer sleeve 16 is provided with a through-hole 25 which effects a connection between an axial groove in the outer circumference of the outer sleeve 16 and the annulus between the outer sleeve 16 and the adapter sleeve 11. The axial groove in the outer circumference of the outer sleeve 16 is in alignment with an axial groove 26 in the outer circumference of the basic receiver component 6 so that gases or foreign matter, such as grease, which enter into the thin annular gap 23 can escape towards the outside in accordance with the arrows E shown in FIG. 1.

The basic receiver component 6 rests, with an outer annular flange which forms part of it, on a shoulder 18 in the borehole in the cartridge chamber 1 and a threaded ring 19 screwed into the upper section of the borehole presses the flange on the basic receiver component 6 against the shoulder 18 with its lower front area 20. The ballistic force transducer according to the present invention is fixed in this way in the borehole of the cartridge chamber 1. It should be pointed out that the basic receiver component 6 has two axial grooves 26 (not shown) preferably diametrically opposite each other on its outer circumference for reasons which will be further discussed in connection with FIG. 2.

Figure 2:
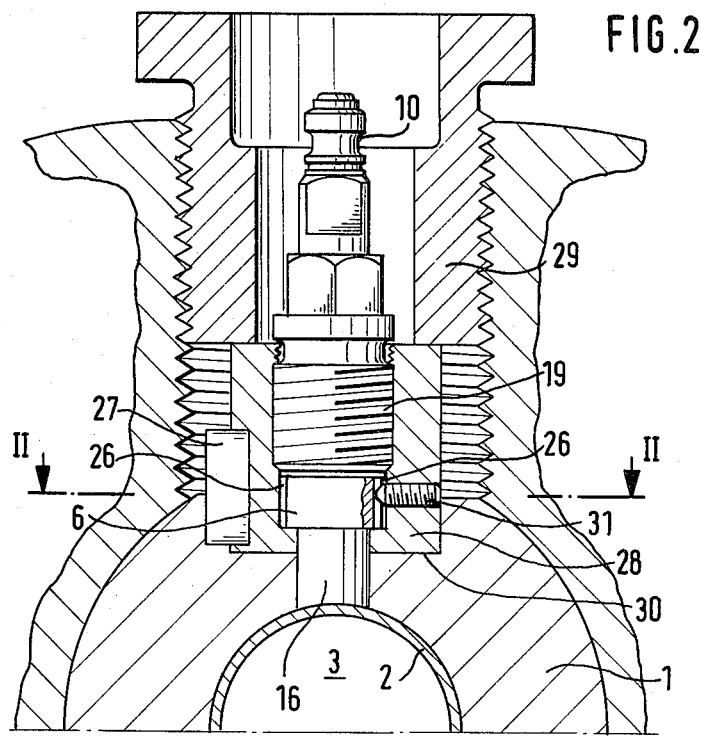
FIG. 2 is a modified design of the force transducer shown in FIG. 1 for use with large caliber firearms.

FIG. 2 illustrates a modified design of the ballistic force transducer according to FIG. 1 whereby parts similar to those shown in FIG. 1 have the same reference numbers. The design according to FIG. 2 is characterized by the provision of an adapter element 28 which is especially used when the ballistic force transducer is applied to large heavy arms with thick walls in the area of the cartridge chamber 1. The adapter element 28 effects a good repositioning of the front areas 21 and 22 of the transducer in relation to the cartridge chamber 1 or the cartridge case 2 in case the transducer must be repeatedly mounted and dismounted for maintenance purposes or renewed calibration purposes.

Figure 2A:
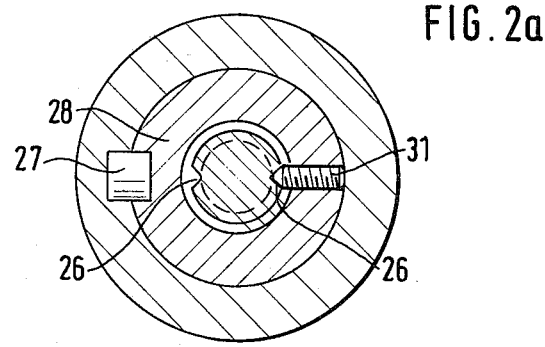
FIG. 2a is a cross-section taken along line II—II of FIG. 2.

As is shown especially in FIG. 2a, the adapter element 28 is fixed in its location in the cartridge chamber 1 by a key 27 which is positioned in corresponding opposite grooves in the cartridge chamber 1 and adapter element 28. A threaded ring 29 can be screwed into a threaded borehole in a jacket surrounding the cartridge chamber 1 and pushes the adapter element 28 against the key 27 and the bottom 30 of the borehole in the cartridge chamber 1. An adjusting screw 31 with a conically shaped front part is screwed into a threaded borehole in the adapter element 28 and engages its conically shaped front part into one of the two diametrically opposite axial grooves 26, (see FIG. 1) in order to fix the basic component 6 of the force transducer in a certain position relative to the cartridge chamber 1. The adjusting screw 31 engaged in the axial groove 26 has, therefore, only an alignment function while the opposite axial groove 26, as described in connection with FIG. 1, continues to serve the purpose of leading the gases or grease entering the annular gap 23 into the outside atmosphere. The remaining design of the ballistic force transducer according to FIG. 2 corresponds with that shown in FIG. 1.

For reasons which will become clear further below, the front areas 21 and 22 which rest on the outer surface of the cartridge case 2 should be exactly adapted to the circumferential and axial (conical) shape of the cartridge case 2. This is achieved in accordance with the present invention in that the front areas 21 and 22 are initially designed with a plane surface prior to the installation of the transducer into the firearm and by having them project somewhat into the borehole in the cartridge chamber 1. After having fixed the recorder in the cartridge chamber 1, a reamer is introduced into the borehole which receives the case 2 and the material projecting at the outer sleeve 16 and the power transmission piston 4 is reamed until the flush configuration shown in FIG. 1 of the front areas 21 and 22 is produced. The reaming of cartridge chambers is a customary operation in arms technology and the appliances and tools required for this purpose are commercially available.

Figure 3A:
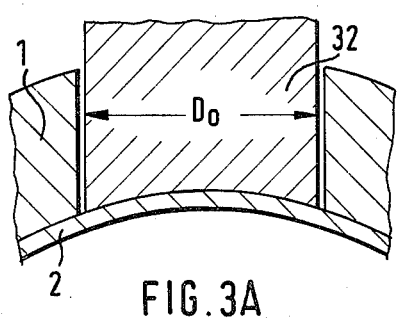
FIGS. 3a and 3b are schematic representations illustrating the contact conditions between a cartridge case and a force transmission element in connection with transducers of traditional design.
Figure 3B:
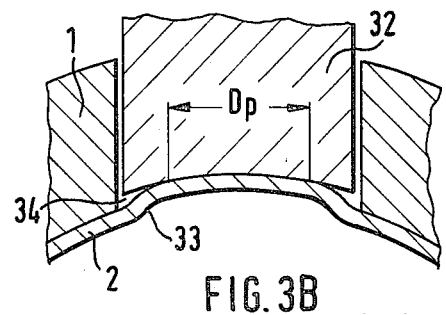
Figure 3C:
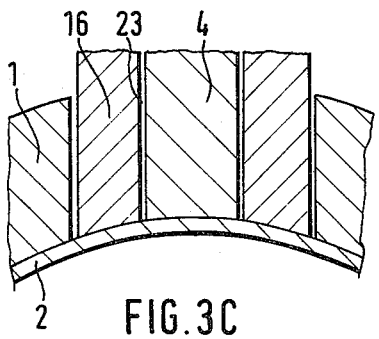
FIGS. 3c through 3e are schematic representations illustrating the contact conditions between a cartridge case and the force transmission element in connection with a force transducer having an outer sleeve according to the invention.
Figure 3D:
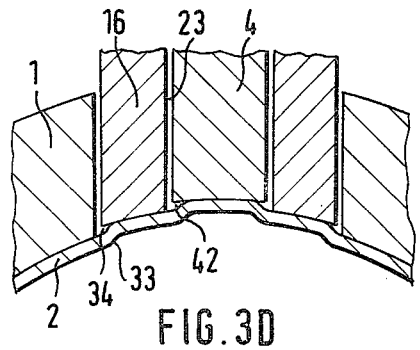
Figure 3E:
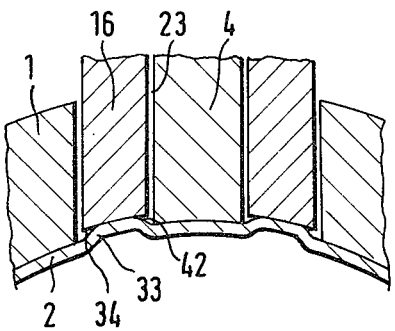

According to the present invention, the spring rigidities or spring constants of the force transmission piston 4 and outer sleeve 16 vis-a-vis the specific area pressure exerted on their front areas 21 and 22 are harmonized with each other in such a way that both parts use the same or approximately the same paths of springiness. This will be further explained with the help of FIGS. 3a to 3f. FIGS. 3a and 3b show, in this connection, ballistic pressure transducers without an outer sleeve surrounding the force transmission piston while FIGS. 3c to 3e show a force transducer according to the present invention.

As previously mentioned above, it is not possible to design a force transmission piston such as reference number 32 in FIG. 3a in such a way that its rigidity in the axial direction is on the same level with that of the cartridge chamber 1 with the expansion of the cartridge case 2. Therefore, the force transmission piston 32 always yields somewhat to the effect of a pressure load and forms a depression in comparison with the cartridge chamber 1. This depression is the cause of the essential non-linearities in the calibration curve $Q=f(P)$ with Q being the charge and P being the combustion pressure in the cartridge. The deformation 33 occurring due to the formed depression in the cartridge case 2 as shown in FIG. 3b causes the development of an annular gap 34 between the front area of the force transmission piston 32 and the outer surface of the cartridge case 2. FIG. 3a shows, on the other hand, the conditions as they exist in connection with a pressure transducer of a known design directly after the expansion of the cartridge case but with the cartridge chamber 1 being not yet subjected to the charge. In this condition, the force transmission piston 32 rests, without forming a gap, against the cartridge case 2. FIG. 3b shows the conditions with a high pressure inside the cartridge case 2 of, for example, 3000 bar. The cartridge case 2 is circumferentially somewhat lifted off the power transmission piston 32 so that the annular gap 34 develops between case 2 and piston 32 which is wedge-shaped in its cross-section. This annular gap 34 has the result that the original contact surface between the piston and the cartridge case which is determined by the diameter $D_o$ of the force transmission piston 32 is correspondingly reduced in size as shown by the diameter $D_p$ of the reduced contact surface illustrated in FIG. 3b. Since the contact surface is the active surface of the pressure, the transmission factor of the pressure to the sensor element of the transducer or to the measuring quartz elements is also reduced. In other words, the original calibration factor of the transducer falls off. Thus, instead of the linear relationship between the charge Q and the pressure P (Curve 38) shown in FIG. 4, a degressive course of the curve develops as shown by Curve 37 in FIG. 4. Such a non-linear calibration curve 37 is undesirable as the straight line 38 is required. There is an analogous connection between the springiness or compression h of the force transmission piston and the emitted piezoelectric charge Q so that the curves 37 and 38 in FIG. 4 also reflect the ratio h=f(P) under the above metioned conditions.

Figure 4:
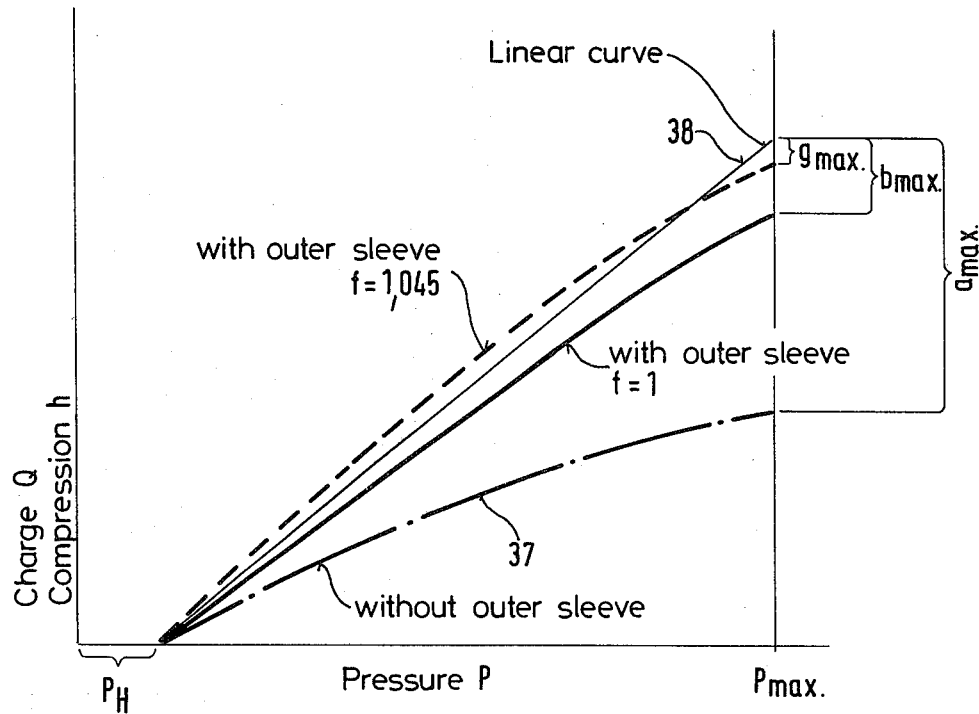
FIG. 4 is a graphic representation illustrating the charge emitted by the piezoelectric sensor element in dependence on the pressure on the force transmission element in connection with a pressure transducer of traditional design and a force transducer according to the present invention.

The path of the non-linear calibration curve 37 in FIG. 4 can be represented by means of the following equations:

$$h = h_o \left[ \frac{P - P_H}{P_{max} - P_H} - u \times \left( \frac{P - P_H}{P_{max} - P_H} \right)^2 \right] \quad (1)$$

$$Q = Q_o \left[ \frac{P - P_H}{P_{max} - P_H} - u \times \left( \frac{P - P_H}{P_{max} - P_H} \right)^2 \right] \quad (2)$$

where:
- h = effective compression of the power transmission piston;
- $h_o$ = compression of the power transmission piston with a pressure $P_{max}$ acting uniformly across its entire front area;
- Q = effective charge emitted by the measuring quartz transducers with pressure P;
- $Q_o$ = charge emitted by the measuring quartz transducers with a pressure $P_{max}$ acting on the entire front area of the power transmission piston;
- P = pressure;
- $P_{max}$ = maximum pressure;
- $P_H$ = pressure required for the expansion of the cartridge case;
- u = coefficient for the quadratic divation from linearity.

An ideal calibration curve would only contain the linear term in equations (1) and (2) while the quadratic term represents the deviation from linearity and is the result of the changed contact conditions between the force transmission piston and the cartridge case.

This quadratic error, called hereafter a, can actually be easily reproduced and could be taken into consideration for the calibration. However, the size of the reduction in diameter of $D_o$ in FIG. 3a to $D_p$ in FIG. 3b depends very much on the rigidity of the respective cartridge case so that the quadratic error a can differ in a corresponding manner on a case by case basis. The manufacturers of prior art ballistic pressure transducers envisage, therefore, performing a static pressure calibration targeted to the respective conditions of application with a gas or a liquid on the firearm in question. However, such a static pressure calibration can involve additional errors of up to 30%, for example, caused by the nature of the applied pressure, and is, therefore, undesirable.

Such a calibration with a gas or a liquid can be eliminated with the force transducer according to the present invention. This is the result of additionally providing the harmonized outer sleeve 16 which largely prevents the occurrence of the quadratic error a as well as errors of higher order. This will be explained with the help of FIGS. 3c and 3d. In a slightly charged condition of the cartridge case 2, the front areas of the outer sleeve 16 and of the force transmission piston 4 rest coextensively in a flush manner on the outer surface of the cartridge case 2 as shown in FIG. 3c due to the reaming of the cartridge chamber 1. Under a higher pressure, the outer sleeve 16 and the force transmission piston 4 recede due to the expansion of the cartridge case 2 vis-a-vis the borehole of the cartridge chamber 1 as shown in FIG. 3d. However, since the dimensions of the front areas 21 and 22 as well as the elasticities of the outer sleeve 16 and of the force transmission piston 4 are coordinated with each other in a manner according to the present invention, the relative shifting of the two parts towards each other is practically zero.

Figure 5:
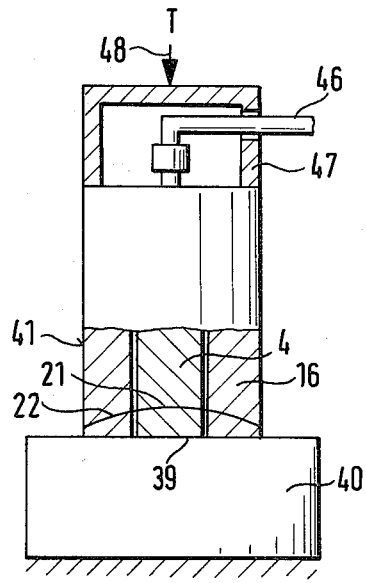
FIG. 5 is a schematic view of an arrangement for the calibration and adjustment of a force transducer according to the present invention.

This coordination is achieved in an expedient manner by performing a force sensitivity test on a test stand prior to the installation of the transducer into the cartridge chamber, i.e. before the front areas 21 and 22 of the outer sleeve 16 and of the power transmission piston 4 are adapted to the curvature of the cartridge case 2. Initially, the force sensitivity $E_1$ of the force transmission piston 4 is determined on its own, i.e, without the outer sleeve 16. Then, the entire transducer together with the outer sleeve 16 is pressed against the plane surface 39 of a steel block 40 as shown in FIG. 5 and the then resulting force sensitivity $E_2$ is determined. According to the present invention, a coordination of the spring rigidities of the outside sleeve 16 and of the force transmission piston 4 is given when:

$$E_2 = K \cdot E_1 \quad (3)$$

with $$K = \frac{1}{1 + \frac{F_2}{F_1}} \cdot f$$

where:
- $F_1$ = size of the front area of the force transmission piston 4;
- $F_2$ = size of the front area of the outer sleeve 16;
- f = correction factor (explained below).

The introduction of the calibration force T in FIG. 5 is effected through a casing 47 with a recess through which a cable 46 is passed leading to an amplifier and a recording unit.

The outer sleeve 16 must be somewhat overdimensioned prior to the above mentioned coordination with regard to the thickness of its wall so that, initially, too small a factor K is obtained. Then, the outer sleeve 16 is carefully trued at the point H 41 of its outer circumference as shown in FIG. 1 whereby the factor K increases until the above indicated reduction ratio K is reached. Subsequently, it is guaranteed that the force is uniformly distributed on the transmission piston 4 and the outer sleeve 16, i.e. the same area pressure prevails everywhere.

The clamping conditions for the basic adjustment of the ballistic force transducer according to the present invention do not correspond entirely with the installation conditions in a firearm due to the influence of the cartridge case 2 since the influence is not yet taken into consideration of the deformation 33 of the cartridge case occurring at the transition point between the cartridge chamber 1 and the outer sleeve 16 as shown in FIG. 3d. This deformation 33 which, in contrast to the prior art pressure transducer shown in FIG. 3a, does not have a direct effect on the force transmission piston is, as mentioned above, responsible for the quadratic error a. The theoretically equally high springiness or compression of the outer sleeve 16 and the force transmission piston 4 is not fully attained due to the deformation 33 of the cartridge case 2 and the formation of the relatively large annular gap 34. A slight relative shifting actually develops between the force transmission piston 4 and the outer sleeve 16 (See FIG. 3d) so that an annular gap 42 is produced at the transition point between the power transmission piston 4 and the outer sleeve 16 which is, however, considerably smaller than the annular gap 34 at the deformation point 33 of the cartridge case 2 and has, therefore, a correspondingly lower influence on the deviation from the linear calibration curve. The reduction of the pressure action surface, caused by the annular gap 42, on the force transmission piston 4 leads to a deviation from the linear calibration curve, called hereafter b, which is lower by one order of magnitude than the aforementioned deviation a and, as can be shown by calculation, is dependent on the pressure P to the 4th power.

Figure 3F:
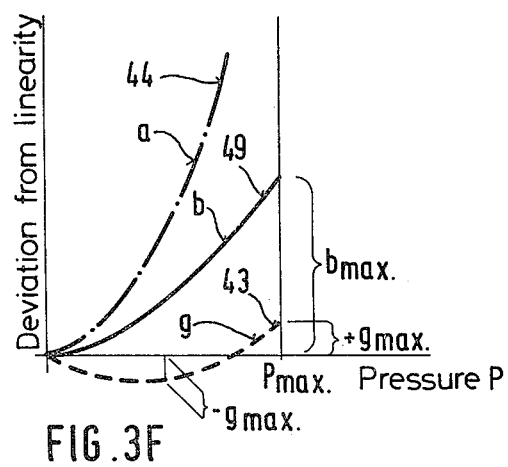
FIG. 3f is a graphic representation illustrating the course of the deviations from the linear relation in connection with a pressure transducer of traditional design and a force transducer according to the present invention.

The path of this deviation $b=f(P)$ is given in FIG. 3f by the solid curve 49 for a typical ballistic force transducer according to the present invention with a ratio of the outer diameter of the outer sleeve 16 to the outer diameter of the force transmission piston 4 of 2:1 and $f=1$ in equation (3). As a comparison, the dotted curve 44 in FIG. 3f shows the path of the quadratic deviation $a=f(P)$ for a transducer of the traditional design.

Thus, an extensive adjustment of the effective curve $Q=f(P)$ to the linear curve can be attained with the feature of the present invention of providing an outer sleeve 16 adjusted in a targeted manner to the springiness behavior of the force transmission piston 4.

As will be shown below, the approximation to the linear curve $Q=f(P)$ can be further improved by designing the force transmission piston 4 is to be somewhat more rigid, for example, by 4.5%, than the outer sleeve 16 instead of a correction factor $f=1$, i.e., the same level of area pressure on the outer sleeve 16 and the force transmission piston 4. The correction factor f then becomes higher than 1, for example, 1.045. In this manner, the force transmission piston 4 is not only exposed to a depression in comparison with the outer sleeve 16 with a continuous pressure increase in accordance with FIG. 3d but projects somewhat above the front area 22 of the outer sleeve 16, for example, at $P=0.4P_{max}$, while at $P=0.8P_{max}$ the front areas of the two parts 4, 16 are in alignment with each other and, at $P>0.8P_{max}$, a depression of the force transmission piston 4 develops again in comparison with the outer sleeve 16 (See FIG. 3e).

Under these conditions, the deviation b from linear follows the dotted curve 43 in FIG. 3f in place of the curve 49. Instead of a shifting error b being effective all the way through in one direction, a shifting error $\pm g$ is obtained which shows up in a first section as a positive deviation and in a second section as a negative deviation from the linear curve $Q=f(P)$. The one-side shifting error b can be reduced by one order of magnitude by this measure so that it can be neglected for all practical purposes.

It is to be pointed out that, instead of the calculation with a correction factor $f>1$ or 1.045, similar results can also be obtained by the fact that, while maintaining $f=1$, the rise of the linear curve is changed in such a fashion that it represents quasi an averaging of the effective curve $q=f(P)$. In other words, the pressure calibration factor Q/P which results from the power calibration according to FIG. 5 is multiplied with a factor $k<1$, for example, 0.955 (corresponding to a reduction by 4.5%). This does not actually reduce the error b but is distributed along the shifted linear calibration curve in the direction of plus and minus. The last mentioned process actually amounts to approximating a parabolically running curve by a straight line.

After the ballistic force transducer according to the present invention has been adjusted in the described manner, the user of the measuring arrangement need only effect the final adaptation of the front areas 21, 22 of the outer sleeve 16 and of the force transmission piston 4 to the curvature of the cartridge chamber 1 with the help of a cartridge chamber reamer. The force transmission piston 4 is, on an average, shortened more than the outer sleeve 16 by means of the reaming operation. The effected basic coordination of the elasticities of these parts is somewhat altered in this way depending on the radius of the borehole in the cartridge chamber 1 and on the dimension of the outer sleeve 16 and the force transmission piston 4 which can lead to a stiffening of the force transmission piston 4 by a value of approximately 0.5% in connection with traditional infantry ammunition. The correction factor f is to be correspondingly reduced due to this effect, for example, from 1.045 to 1.04, or the aforementioned correction factor K for the calibration constant is to be raised from, for example, 0.955 to 0.96. It is to be pointed out that the value for the stiffening effect of the force transmsision piston 4 due to the reaming operation of its front area 21, which was given to be 0.5% applies as long as the ratio of the diameter of the cartridge case to the diameter and length of the force transmission piston 4 remains approximately the same. If a force transducer according to the present invention is used for ballistic measurements on large-caliber firearms, such as cannons, without enlarging at the same time the transducer itself, the indicated ratio would considerably decrease between the dimensions of the force transducer and the cartridge case. Accordingly, the stiffening factor resulting from the reaming operation is also to be reduced.

It is, furthermore, to be pointed out that a spring effect of the nature of an annular spring is exerted on the force transmission piston in connection with the prior art transducer design as well as with that of the present invention by means of the formation of the annular gap 34 or 42 at the cartridge case 2 which transmits forces from the cartridge chamber 1 or the outer sleeve 16 to the force transmission piston. This spring effect which can also lead to a deviation from the linear path of the calibration curve is, however, much lower in the case of the force transducer according to the present invention, due to the reduced deformation of the cartridge case 2, at the force transmission piston than in the case of transducers of traditional design and it can be neglected for practical measuring.

EXAMPLE

Below, an example is given for a piezoelectric force transducer according to the present invention for ballistic measurements in hand firearms of typical design. The given values refer to cartridge cases of brass or a similar stiff material whereby it is a question of typical infantry ammunition with a conical average outer diameter of 8.6 mm. The maximum pressure developed with the ignition of the powder supply 3 in the cartridge case amounts to $P_{max}=3200$ bar; an initial pressure $P_H=200$ bar is required for the initial expansion of the cartridge case. The basic dimensions of the ballistic transducer used amounted to:

Outer diameter of the outer sleeve (at the point 22)=6.3 mm

Outer diameter of the force transmission piston (at the point 21)=3.2 mm

Width of the annular gap $23 \leq 0.2$ mm

Length of the force transmission piston =4 mm

Factor K (Equation (3))=0.25

With a correction factor f=1 in equation (3), the maximum unidirectional deviation $b_{max}$ from linear amounts to 0.63% and this value $b_{max}$ is reduced to $\pm g_{max}=0.02\%$ with a factor f=1.045. In comparison, the maximum quadratic deviation $a_{max}$ amounts to 5.6% for a ballistic pressure transducer of a traditional design without an outer sleeve.

The maximum relative shifting amounts to 8.4 $\mu$m at $P=P_{max}$ between the outer sleeve 16 and the force transmission piston 4 which leads to the formation of the annular gap 42 in FIG. 3d. On the other hand, the shifting between cartridge chamber and force transmission piston comes to 141.6 $\mu$m according to equation (1) for a pressure transducer without an outside sleeve.

Due to the considerably lower deformation of the cartridge case 2 at the transducer component (force transmission piston) transmitting the measuring force, the error caused by the above-mentioned spring effect of the cartridge case is practically negligible.

As a result, a ballistic force transducer is produced by the present invention which offers to the user the essential advantage that it does not require a static calibration test to be performed on the respective firearm but it can be supplied by the manufacturer with given calibration curves. The provision of the outer sleeve 16 which surrounds the force transmission piston 4 at its outside at a slight distance leads to a higher reproducibility of the measurements due to a better force distribution on the measuring quartz element 5. The opinion which is often contained in textbooks that the piezoelectric sensitivity, for example, of quartz elements longitudinal effect, is independent of the power initiation surface and of the dimension of the quartz elements applies only approximately i.e., when the deformation of the quartz elements can take place without obstruction in all coordinate directions. If this is not the case, for example, when the deformations are entirely suppressed in the Y and Z directions, a reduction in the piezoelectric response sensitivity of a quartz element takes place. In practice, there exists, as a rule, neither an entirely free nor an entirely deformation-obstructed condition.

Thus, the power response sensitivity of a piezoquartz transducer is influenced by the nature of the force initiation. As to the resting of the force transmission piston 4 on the surface of the cartridge case 2, it cannot always be assumed that ideal contact conditions exist in spite of careful adjustment. Displacements of fractions of micrometers are actually sufficient to possibly cause considerable differences in the charge on individual areas of the force transmission piston 4. Ballistic pressure transducers prior art designs use mostly measuring quartz elements by utilizing the piezoelectric longitudinal effect which are arranged very closely to the cartridge case 2. There is no force transmission piston in the actual sense between the measuring quartz elements and the cartridge case anymore but only a thicker partition or diaphragm into which the curvature of the cartridge case is machined. Therefore, inhomogeneities at the contact surface of such pressure transducers on the cartridge sleeve show up directly as inhomogeneities in the force distribution on the measuring quartz elements and effect different pressure response sensitivities depending on the nature of the inhomogeneity, for example, end pressure or contact in the center.

In contrast, a homogenization of the force initiation on the measuring quartz elements is achieved by the use, according to the present invention, of a relatively long force transmission piston 4 and the recessing of the measuring quartz elements 5 caused by it so that the force acts uniformly upon them on the part of the front areas 7 and 13 of the basic receiver component 6 and the force transmission piston 4.

The expansion of the cross-section of the force transmission piston 4 in the range of its front area 13 engaged with the measuring quartz element 5 has the advantage that the force resulting from the pressure action on the active front area 21 of the force transmission piston 4 is expressed in a reduced surface pressure of the measuring quartz element 5. Therefore, higher explosion pressure can be measured in the cartridge case with the ballistic force transducer according to the present invention than with transducers of traditional design. Since, additionally, the mass of the force transmission piston 4 is thus reduced and, on the other hand, measuring quartz elements 5 of a greater stiffness can be provided, this results in a higher fundamental frequency of the recording system and thus in a lower sensitivity vis-a-vis acceleration forces. The decrease in the charge sensitivity caused by the reduction in the active front area 21 of the force transmission piston 4 in comparison with the contact surface 13 for the quartz elements has little practical importance since there are always very high pressures in ballistic measuring and thus high piezoelectric charges are produced in any case.

In the case of ballistic pressure transducers of the traditional design with support on the cartridge case over a diaphragm, there always develops a secondary force flow from the diaphragm into the surrounding transducer casing. In this way, up to 50% of the effective pressure forces can be led past the measuring quartz elements. Also other influences, for example, friction, jamming, leakage gases or grease which is pushed into the cartridge chamber, have such power-diverting effects. In contrast, such power shunts have little or no effect in connection with the present invention since the power transmission piston 4 can elastically yield entirely independently of the surrounding components of the power recorder so that the erroneous signals resulting from the mentioned power shunts no longer occur. The leakage gases in the cartridge chamber 1 which were expelled during the combustion of the supply of powder 3 in the cartridge case 2 as well as grease or such possibly contained therein can easily escape into the outside atmosphere through the annular gap 23 between the outer sleeve 16 and the force transmission piston 4 and thus do not exert a lateral pressure on the thin adapter sleeve 11. Such a lateral pressure on the adapter sleeve 11 could also have an effect on the measuring quartz elements 5 leading to erroneous measured values.

Another advantage resulting from the recessing of the measuring quartz elements 5 obtained with the relatively long force transmission piston 4 lies in the fact that the effects of temperature, particularly temperature transients, which frequently interfere in ballistic measuring are considerably moderated.

In summary, the present invention makes it possible to make available a force transducer for ballistic pressure measuring acting preferably in a piezoelectric manner which provides very easily reproducible signals even when it is used by a person who is not especially familiar with measuring techniques. Since the sensitivity no longer depends on many accidental occurrences during the installation, the user can directly convert the measuring signal produced by the transducer into a definite pressure value by means of the calibration factor made available by the manufacturer whereby only the pressure threshold value $P_H$ necessary for the initial expansion of the cartridge case is to be added. This pressure threshold value $P_H$ can be calculated with sufficient accuracy from the diameter and wall thickness of the cartridge case.

The present invention has been described above in connection with ballistic pressure measuring on firearms. However, it goes without saying that it is not restricted to the present application but can be similarly used advantageously for static and dynamic pressure measuring where, for certain reasons, the pressure does not act directly on the force transmission element of the transducer but passes through an expansion element. Even though, as described above, a piezoelectric sensor element is presently preferred in the form of one, or several, preferably semi-annular shaped transversal quartz elements. Also longitudinal quartz elements or, possibly, measuring quartz elements responding piezoelectrically only to shearing forces by correspondingly adjusting the force initiation can be provided. The term "sensor element" includes, furthermore, suitably polarized piezoelectric ceramics as well as other materials reacting piezoelectrically to the action of a force. Also electrical resistive elements such as resistive wire strain gauges and piezoresistive elements with associated semiconductors and the like may be utilized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A force transducer for use in ballistic pressure measurement, which comprises:
   a force transmission element including a first surface exposed to a pressure to be measured;
   sensor element means for producing an electrical signal representing said pressure to be measured, said elements being held under pretension between a second surface of said force transmission element and a basic receiver component; and
   an outer sleeve surrounding the exterior of said force transmission element, said outer sleeve being coupled to said basic receiver component, said outer sleeve including a front surface exposed to said pressure to be measured;
   wherein the spring rigidity of said outer sleeve is coordinated with the spring rigidity of said force transmission element such that said outer sleeve yields to approximately the same extent as said force transmission element to the effective force of said pressure to be measured in an axial direction of said transducer.

2. The force transducer as recited in claim 1, wherein:
   the ratio of the spring rigidity of said force transmission element divided by the area of said first surface of said force transmission element exposed to said pressure to be measured to the spring rigidity of said outer sleeve divided by the area of the front surface of said outer sleeve exposed to the pressure to be measured lies in the range of 0.95 to 1.15.

3. The force transducer as recited in claim 1 or claim 2, wherein:
   the force response sensitivity $E_1$ of said force transmission element to the force response sensitivity $E_2$ of said force transmission element and said outer sleeve follows the relation:

$$E_2 = \frac{1}{1 + \frac{F_2}{F_1}} \cdot E_1 \cdot f$$

where:
   f is a correction factor coordinating the spring rigidity of said outer sleeve with the spring rigidity of said force transmission element and lying in the range of 1.0 to 1.05;
   $F_1$ is the area of said first surface of said force transmission element exposed to said pressure to be measured; and
   $F_2$ is the area of said front surface of said outer sleeve exposed to said pressure to be measured.

4. The force transducer as recited in claim 3, wherein:
   said first surface of said force transmission element exposed to said pressure to be measured and said first surface of said outer sleeve exposed to said pressure to be measured have a size ratio of approximately 1.3.

5. The force transducer as recited in claim 1, wherein said force transmission element comprises:
   a force transmission piston extending in said axial direction of said transducer, said piston including a first surface exposed to said pressure to be measured and a second surface upon which said sensor element means rests, said first and second surfaces of said piston being in an opposed relationship to each other, said first surface of said piston having a smaller area than that of said second surface of said piston.

6. The force transducer as recited in claim 1, which further comprises:
   a narrow annular gap located between said outer sleeve and said force transmission element, said gap being coupled with the outside atmosphere.

7. A force transducer for use in ballistic pressure measurement, which comprises:
   a force transmission piston including a first surface exposed to a pressure to be measured, said piston including a second surface located in an opposed relationship to said first surface, said piston extending in an axial direction of said transducer an adapter sleeve at least partially surrounding said piston and coupled thereto, said adapter sleeve coupling said piston to a basic receiver component;

at least one piezoelectric transversal quartz element held under pretension between said second surface of said piston and said basic receiver element, said at least one element producing electrical signals representing said pressure to be measured; and an outer sleeve surrounding the exterior of said piston, said outer sleeve being coupled to said basic receiver component, said outer sleeve including a front surface exposed to said pressure to be measured, a narrow annular gap being provided between said outer sleeve and said piston, said gap being coupled with the outside atmosphere;

wherein the spring rigidity of said outer sleeve is coordinated with the spring rigidity of said piston such that said outer sleeve yields to approximately the same extent as said piston to the effective force of said pressure to be measured in said axial direction.

8. A method for producing a force transducer including a force transmission element having a first surface exposed to a pressure to be measured and a second surface opposed to said first surface, and including a sensor element held under pretension between said second surface of said force transmission element and a basic receiver element, said method comprising the steps of:

determining the power response sensitivity $E_1$ of said force transmission element by its own;

arranging an outer sleeve about the exterior of said force transmission element, said outer sleeve being coupled to said basic receiver element, said outer sleeve having a front surface aligned with said first surface of said force transmission element and exposed to said pressure to be measured, said outer sleeve having a nominal wall thickness;

determining the force response sensitivity $E_2$ of the combination of said force transmission element and said outer sleeve; and reducing the wall thickness of said outer sleeve to satisfy the equation:

$$E_2 = \frac{1}{1 + \frac{F_2}{F_1}} \cdot E_1 \cdot f$$

where:

$F_1$ is the area of said first surface of said force transmission element exposed to said pressure to be measured;

$F_2$ is the area of said front surface of said outer sleeve exposed to said pressure to be measured; and f is a correction factor.

9. The method of producing a force transducer as recited in claim 8, wherein the correction factor f lies in the range of 1.0 to 1.05.

10. The method of producing a force transducer as recited in claim 8, which further comprises the steps of:

mounting said force transducer on a pressure carrying part; and adapting the shapes of the first surface of said force transmission element and the first surface of said outer sleeve to conform to the configuration of said pressure carrying part.

11. The method of producing a force transducer recited in claim 8, which further comprises the steps of:

introducing said force transducer into the cartridge chamber of a firearm; and adapting said force transducer to the configuration of the bore hole of said cartridge chamber by reaming the first surface of said force transmission element and the front surface of said outer sleeve such that said first surface and said front surface rest in a flush manner on the outer surface of a cartridge case introduced into said cartridge chamber bore hole.

* * * * *